United States Patent
Tanaka et al.

(10) Patent No.: US 7,564,879 B2
(45) Date of Patent: Jul. 21, 2009

(54) LASER SYSTEM

(75) Inventors: Eiichi Tanaka, Tokyo (JP); Tetsuo Kojima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 23 days.

(21) Appl. No.: 11/632,164

(22) PCT Filed: Apr. 8, 2005

(86) PCT No.: PCT/JP2005/006911

§ 371 (c)(1),
(2), (4) Date: Jan. 11, 2007

(87) PCT Pub. No.: WO2006/114842

PCT Pub. Date: Nov. 2, 2006

(65) Prior Publication Data

US 2007/0263677 A1 Nov. 15, 2007

(51) Int. Cl.
*H01S 3/11* (2006.01)
(52) U.S. Cl. ............ 372/10; 372/13
(58) Field of Classification Search ............ 372/13, 372/10; 359/305
See application file for complete search history.

(56) References Cited

U.S. PATENT DOCUMENTS

| | | | | |
|---|---|---|---|---|
| 5,181,135 A | * | 1/1993 | Keeler | ............ 398/104 |
| 5,247,388 A | * | 9/1993 | Anderson et al. | ............ 359/287 |
| 5,400,350 A | | 3/1995 | Galvanauskas | |
| 5,721,749 A | * | 2/1998 | Holleman et al. | ............ 372/13 |

FOREIGN PATENT DOCUMENTS

| | | |
|---|---|---|
| DE | 19512160 A1 | 10/1995 |
| JP | 5-5912 A | 1/1993 |
| JP | 8-46276 A | 2/1996 |
| JP | 10-268369 A | 10/1998 |
| JP | 2001-308427 A | 11/2001 |

* cited by examiner

*Primary Examiner*—Minsun Harvey
*Assistant Examiner*—Michael Carter
(74) *Attorney, Agent, or Firm*—Sughrue Mion, PLLC

(57) ABSTRACT

In the case where, e.g., because of provision of a high-gain and high-energy Q-switched laser oscillator in a laser system in a MOPA configuration, the duration τz from the time point when oscillation-stage Q switches (13a and 13b) start the gate ON to the time point when a pulse laser beam (18) starts to grow is shorter than the fall time τf of amplification-stage Q switches (13c, 13d, and 13e), by implementing control in such a way that the gate-ON timing of the oscillation-stage Q switches (13a and 13b) lag behind the gate-ON timing of the amplification-stage Q switches (13c, 13d, and 13e) by a predetermined time, the loss in the pulse laser beam (18) at the amplification-stage Q switches (13c, 13d, and 13e) can be prevented, while the gain deterioration due to a spontaneously amplified ray (17) produced in the amplification stage is being suppressed. Therefore, a high-energy pulse laser beam can efficiently be obtained.

12 Claims, 11 Drawing Sheets

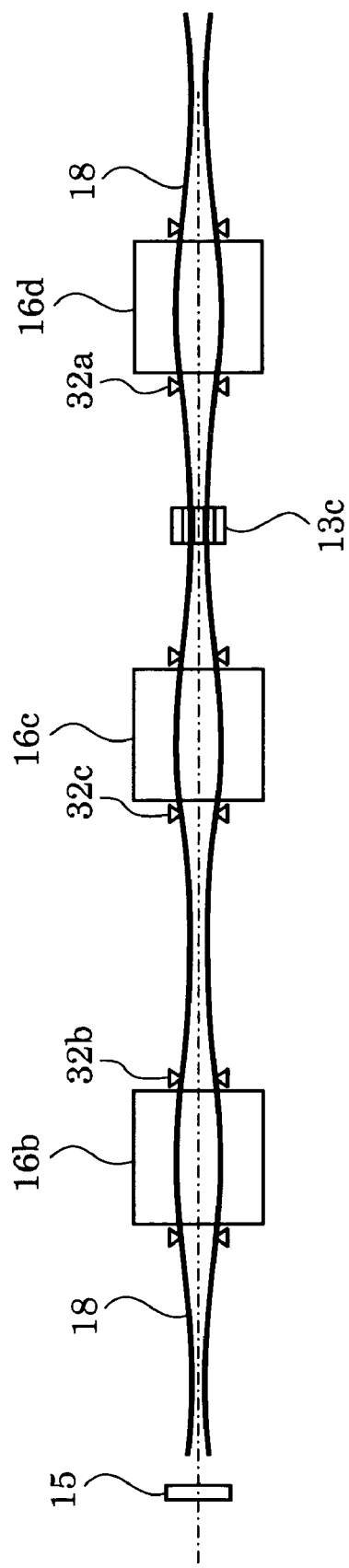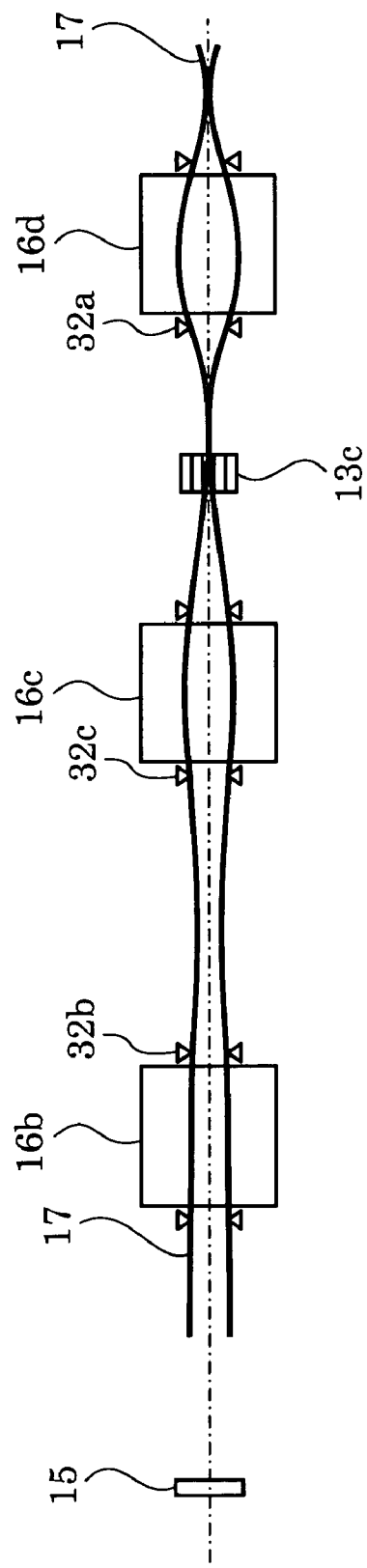

LASER SYSTEM

TECHNICAL FIELD

The present invention relates to a laser system in a MOPA configuration.

BACKGROUND ART

In a MOPA (Master Oscillator Power Amplifier)-configuration laser system in which amplifiers are in a multistage configuration, spontaneous emissions are generated between various levels and outputted, due to pumping in the amplifiers. Due to the spontaneously emitted light, an induced emission is generated and amplified, whereby rays are outputted in directions that are the same or opposite to the direction in which an originally required laser beam advances. Hereinafter, that rays are referred to as spontaneously amplified rays. It has been a problem that, when entering the adjacent amplifier, the spontaneously amplified ray reduces the gain of the amplifier, whereby the output of the originally required laser beam is reduced.

In some of communication-use laser systems, in a MOPA configuration, having a low-energy oscillator, an acoustooptic modulator is interposed between neighboring amplifiers so as to prevent the foregoing problem (e.g., refer to Patent Literature 1).

Unlike a laser system in a MOPA configuration, a laser system is utilized in which, as an amplifier, a resonator is incorporated. Among the foregoing systems in which, by making a pulse laser beam outputted from an oscillator enter an unstable resonator and amplifying the pulse laser beam in the unstable resonator, a high-power pulse laser beam is obtained, there is a high-output pulse laser system in which, in order to prevent an oscillated continuous-wave laser beam from leaking into the unstable resonator, thereby reducing the gain of the oscillator, the ON-timing of the Q switch for the amplifier is made to lag behind the ON-timing of the Q-switch for the oscillator (e.g., refer to Patent Literature 2).

[Patent Literature 1] Japanese Laid-Open Patent Publication No. 1998-268369

[Patent Literature 2] Japanese Laid-Open Patent Publication No. 2001-308427

DISCLOSURE OF THE INVENTION

Hereinafter, a plurality of amplifiers (including a case where only one amplifier exists) will collectively be referred to as an amplification stage. In addition, according to the above procedure, an oscillator will be referred to as an oscillation stage, as may be necessary.

In a laser system disclosed in Patent Literature 1, with regard to operation timings of the amplification-stage Q switch and the oscillation-stage Q switch, nothing is disclosed; therefore, it is uncertain how to prevent the gain reduction of the amplification stage. However, in the case of a laser system, such as the laser system disclosed in Patent Reference 1, that incorporates a low-energy oscillator, by, as disclosed in Patent Reference 2, making the timing when the amplification-stage Q switch opens lag behind the timing when the oscillation-stage Q switch opens, a spontaneously amplified ray from the amplification stage can be suppressed. The method will be explained below with reference to FIG. 13.

FIG. 13 is a graph representing changes with time in the resonator loss and the laser gain in an oscillation stage, the waveform of a pulse laser beam outputted from the oscillation stage, and the loss at an amplification-stage Q switch. Here, the resonator loss is a combination of the loss at a partially reflecting mirror incorporated in a resonator and the loss at a Q switch in the resonator. The loss at a partially reflecting mirror is always constant; therefore, the resonator loss depends on the amount of change in the Q-switch loss.

In FIG. 13, T1 denotes the time point when the oscillation-stage Q switch opens and the loss at that Q switch starts to decrease, whereby the resonator loss starts to fall; T2 denotes the time point when the amplification-stage Q switch opens and the loss at that Q switch starts to fall; T3 denotes the time point when the oscillation-stage laser gain reaches the oscillation-stage resonator loss and a pulse laser beam starts to grow; T4 denotes the time point when the oscillation-stage Q switch is completely opened and the fall of the resonator loss ends; T5 denotes the time point when the amplification-stage Q switch is completely opened and the fall of the loss at that Q switch ends; and T6 denotes the time point when the growth of the pulse laser beam becomes conspicuous and the oscillation stage starts to output the pulse laser beam.

Because, in general, the gain of the low-energy oscillation stage is low, the laser gain rises gradually, as represented in FIG. 13, whereby a certain amount of time is necessary for the resonator loss to reach the laser gain (T2) after the oscillation-stage Q switch opens (T1). In addition, a pulse laser beam starts to grow from T3; when the gain is low, the speed of the growth is slow, whereby the build-up time $\tau b$ is long. Accordingly, by making T2 lag behind T1, the amplification-stage Q switch can be maintained closed until the pulse laser beam reaches the amplification stage; therefore, it is possible to prevent a spontaneously amplified ray from entering other amplifiers and reducing the gain of the amplification stage before the pulse laser beam reaches the amplification stage.

Meanwhile, machining that requires high energy has increased in recent years, whereby, for machining or the like, a laser system has been desired that is in a MOPA configuration and can output a high-energy laser beam. In order to realize such a laser system, it is indispensable to develop a high-gain laser oscillator. In developing a high-gain laser oscillator, the inventor found that the following problems in a laser system in a MOPA configuration are posed by the phenomenon that the higher the gain of a laser oscillator becomes, the shorter the duration from T1 to T3 and the build-up time $\tau b$ become.

In the case where the gain of a laser oscillator is high, changes with time in the resonator loss and the laser gain in the oscillation stage, the waveform of a pulse laser beam outputted from the oscillation stage, and the loss at the amplification-stage Q switch are represented in FIG. 14. T1 to T6 in FIG. 14 indicate the same time points as those in FIG. 13.

As represented in FIG. 14, in the case where the gain of the oscillation stage is high, the laser gain rises so steeply that the duration from the time point when the Q switch opens to the time point when the resonator loss reaches the laser gain, i.e., the duration from T1 to T3 becomes shorter. In addition, a pulse laser beam starts to grow from T3; when the gain is high, the speed of the growth is rapid, whereby the build-up time $\tau b$ is short. Accordingly, the phenomenon occurs that, before the time point T4, the growth of the pulse laser beam ends, i.e., the output of the pulse laser beam from the oscillation stage ends. In this situation, in the case where T2 is made to lag behind T1 as is the case with a low-gain oscillator, the pulse laser beam enters the amplification stage before T5, i.e., the pulse laser beam enters the amplification stage before the amplification-stage Q switch completely opens. The foregoing fact poses a problem that the loss in the amplification-stage Q switch is produced, whereby the amplification-stage output decreases.

Moreover, in the case of a laser oscillator having a higher gain, the duration from T1 to T6 becomes shorter; this fact poses a problem that the pulse laser beam enters the amplification stage before T2, i.e., the pulse laser beam reaches the amplification stage before the amplification-stage Q switch opens, whereby the pulse laser beam does not enter the amplification stage and the laser beam is not emitted from the amplification stage.

In this case, for example, the duration from the time point when the amplification stage Q switch starts to open to the time point when the amplification stage Q switch completely opens, i.e., the duration from T2 to T5 (referred to as a fall time $\tau f$, hereinafter) may be made shorter than the duration in which the pulse laser beam grows, i.e., the duration from T1 to T6. For instance, FIG. 15 is a chart representing change with time in the resonator loss in the oscillation stage and the like in the case where the fall time $\tau f$ is zero. With a configuration as represented in FIG. 15, provision is made for the pulse laser beam to enter the amplification stage after the amplification-stage Q switch completely opens.

However, it is impossible to realize the configuration, as represented in FIG. 15, for a high-energy laser system. In the case of a high-energy laser beam, high-speed Q switches that can deal with high energy include an acoustooptic modulator (referred to as an A/O element, hereinafter). By utilizing the fact that an A/O element functions as a diffraction grating when ultrasound propagates through the A/O element, the A/O element is made to operate as a switching element. The fall time $\tau f$ of an A/O-element Q switch is equal to the time in which a sound wave that propagates through the A/O-element Q switch passes across the beam diameter of a laser beam that passes through the A/O-element Q switch. In the case of a high-energy laser beam, it is not allowed to narrow down the laser beam so extremely as to give damage to the optical system; therefore, the laser beam can be narrowed down at most down to 1 mm in diameter. Because the speed of a sound wave in an A/O element is approximately 6 km/s, the time in which the sound wave passes across the laser-beam diameter is approximately 200 ns.

Meanwhile, in the case of a high-gain oscillation stage, the duration from T1 to T6 reaches several dozen nanoseconds and the fall time can be shorten at most down to approximately several times as long as the time (from T1 to T6) in which the pulse laser beam grows. In other words, the condition represented in FIG. 14 is maintained.

The present invention has been implemented in order to solve the foregoing problems; it is the objective of the present invention that, by, in a laser system in a MOPA configuration, providing a high-gain and high-energy Q-switched laser oscillator, even when the duration from the time point when the oscillation-stage Q switch opens to the time point when a pulse laser beam grows and the laser oscillator starts to output the pulse laser beam is shorter than the fall time $\tau f$ of the amplification-stage Q switch, the loss in the pulse laser beam in the amplification-stage Q switch is prevented, while the gain deterioration due to a spontaneously amplified ray produced in the amplification stage is being suppressed.

A laser system according to the present invention incorporates a Q switch provided in a resonator, a laser oscillator for outputting a pulse laser beam by making the Q switch gate-ON and gate-OFF, one or more amplifiers, for amplifying a pulse laser beam outputted from the laser oscillator, that are arranged along the optical axis of the pulse laser beam, a Q switch that is arranged at a position between the oscillator and the amplifiers or at least one position among positions between the amplifiers and that is made gate-ON a predetermined time earlier than the Q switch of the laser oscillator is made gate-ON.

In a laser system according to the present invention, setting is implemented in such a way that the gate-ON timing of the oscillation-stage Q switch lags behind the gate-ON timing of the amplification-stage Q switch by a predetermined time; therefore, the loss in the pulse laser beam in the amplification-stage Q switch is prevented, while the deterioration, in the gains of the amplifier and oscillator, due to a spontaneously amplified ray produced in the amplification stage is being suppressed, whereby the deterioration in the laser output can be prevented.

BRIEF DESCRIPTION OF THE DRAWINGS

FIG. 12 is a set of diagrams illustrating beam profiles of a laser beam and a spontaneously amplified ray in a laser system according to Embodiment 4 of the present invention;

BEST MODE FOR CARRYING OUT THE INVENTION

Embodiment 1

Figure 1:
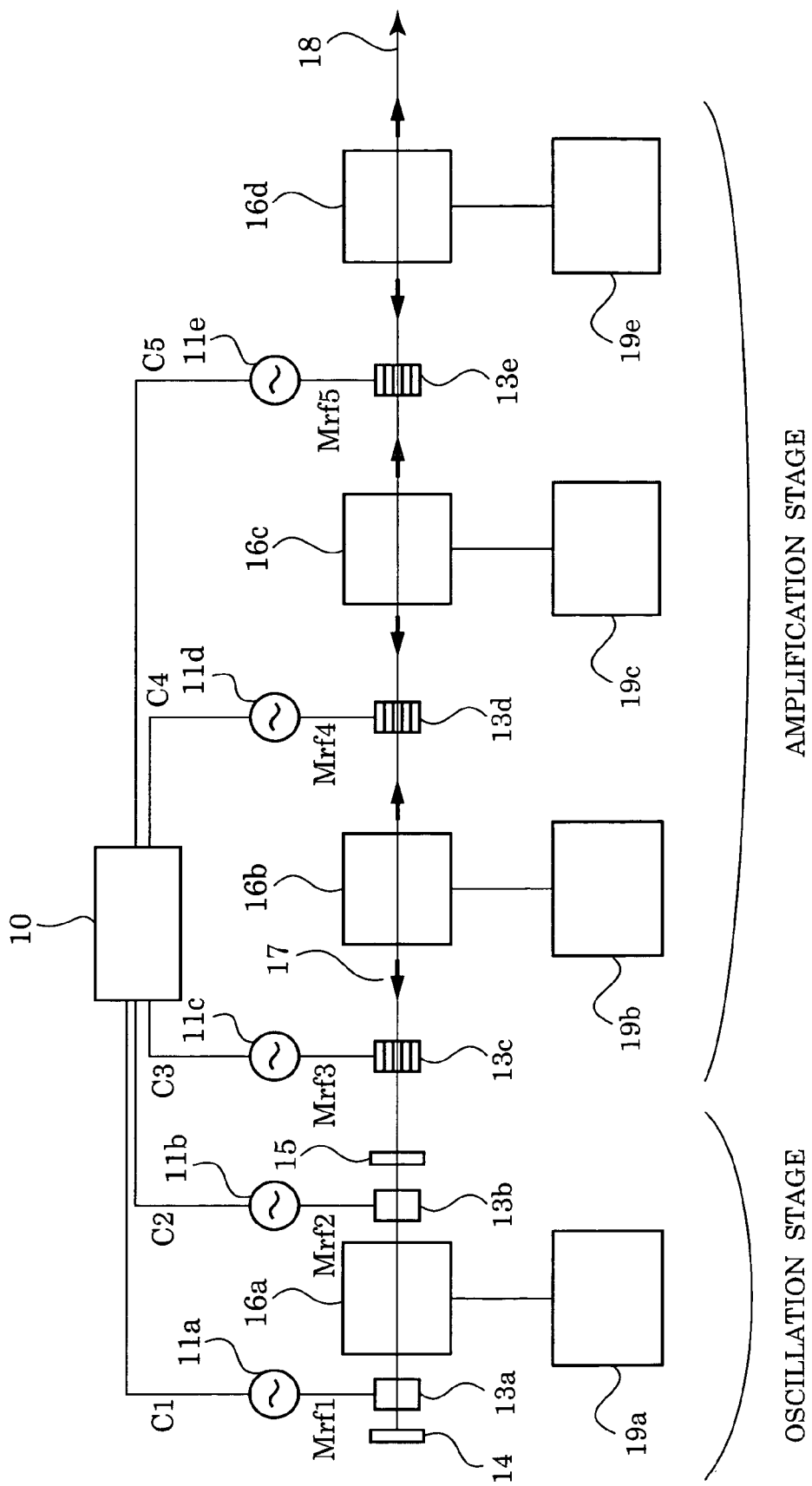
FIG. 1 is a block diagram illustrating a laser system according to Embodiment 1 of the present invention.

FIG. 1 is a block diagram for illustrating a laser system according to Embodiment 1 of the present invention; the laser system is in a MOPA configuration consisting of an oscillation stage having a single oscillator and an amplification stage having three amplifiers. In FIG. 1, Reference Character 16a denotes a laser medium of an oscillation stage; Reference Characters 16b, 16c, and 16d denote respective laser media of an amplification stage; Reference Characters 19a to 19d denote respective pumping sources for pumping the laser media 16a to 16d. In the case of a gas laser in which a laser gas such as $CO_2$ is utilized as the laser medium, discharge electrodes function as a pumping source; in the case of a solid-state laser in which a solid-state laser medium such as a YAG is utilized as the laser medium, a lamp or a laser diode functions as a pumping source.

In the oscillation stage, a totally reflecting mirror 14 and a partially reflecting mirror 15 configure a resonator; pumping of the laser medium 16a by the pumping source 19a causes a laser oscillation, whereby a laser beam 18 is outputted from the partially reflecting mirror 15. Additionally, a Q switch 13a is inserted between the totally reflecting mirror 14 and the laser medium 16a; a Q switch 13b is inserted between the partially reflecting mirror 15 and the laser medium 16a. The laser system is configured in such a way that, through the opening and closing of the Q switches 13a and 13b, a pulse laser beam is oscillated. Hereinafter, the Q switches 13a and 13b are referred to as first Q switches or oscillation-stage Q switches.

In this situation, the laser oscillator is a high-gain type and exemplified, for example, by an oscillator in which the gain per reciprocation within the oscillator is 2.8 or larger and the diffraction efficiency per A/O element is 30% or higher.

In the amplification stage, a Q switch 13c is provided between the oscillation stage and the laser medium 16b; a Q switch 13d, between the laser medium 16b and the laser medium 16c; a Q switch 13e, between the laser medium 16c and the laser medium 16d. While the Q switches 13c, 13d, and 13e are opened (hereinafter, the state in which the Q switch is opened is referred to as a "gate ON" and a duration in which the Q switch is opened is referred to as a "gate-ON time $\tau g$"), the laser beam 18 enters the amplification stage and is amplified therein. The laser system is configured in such a way that, while the Q switches 13c, 13d, and 13e are closed (hereinafter, the state in which the Q switch is closed is referred to as a "gate OFF" and a duration in which the Q switch is closed is referred to as a "gate-OFF time"), no spontaneously amplified ray 17 that is produced in the amplifier leaks into other amplifiers or the oscillation stage. Hereinafter, the Q switches 13c, 13d, and 13e are referred to as second Q switches or amplification-stage Q switches.

Both the gate-ON timing and the gate-OFF timing of the first Q switches and the second Q switches are adjusted and controlled by a switch control unit. In Embodiment 1, as an example of a high-speed Q switch that can deal with a high-energy laser beam, a Q switch employing an A/O element will be explained.

An A/O element is formed of an oscillator and, for example, quartz glass; by utilizing the oscillator to oscillate the quartz glass at high frequency, ultrasound is transmitted through the quartz glass. The ultrasound causes in the quartz glass unevenness in the refraction-index, whereby the quartz glass functions as a diffraction grating. By utilizing the fact that, when the quartz glass functions as a diffraction grating, an incident light is diffracted and the optical path is curved and when the quartz glass does not function as a diffraction grating, an incident light advances straight, switching operation is implemented. In FIG. 1, Reference Characters 11a, 11b, 11c, 11d, and 11e denote harmonic-modulation-signal generators that output respective harmonic modulation signals Mrf's to the Q switches 13a, 13b, 13c, 13d, and 13e each formed of an A/O element. The harmonic-modulation-signal generators 11 are controlled by a Q-switch control unit 10.

Here, a case is explained in which, while the A/O element functions as a diffraction grating, diffracted light is absorbed by a damper (unillustrated), and while the A/O element does not function as a diffraction grating, straight light is utilized as a laser output. It goes without saying that the laser system may be configured in such a way that diffracted light is utilized for laser oscillation and straight light is absorbed by a damper or the like. In the case where straight light is utilized, in the normal mode, the harmonic modulation signal Mrf is inputted from the harmonic-modulation-signal generator 11 to the oscillator of the A/O element; the oscillation of the oscillator transmits ultrasound through the A/O element, the A/O element functions as a diffraction grating, laser light is diffracted, and the Q switch is in the gate OFF mode.

In the case where a pulse laser beam is oscillated, the Q switch of the oscillation stage operates as described below.

In order to make the Q switches 13a and 13b gate-ON for a predetermined time, Q-switch control signals C1 and C2 are concurrently outputted from the Q-switch control unit 10 and inputted to the harmonic-modulation-signal generators 11a and 11b, respectively. After receiving Q-switch control signals C1 and C2, the harmonic-modulation-signal generators 11a and 11b stop the output of the harmonic modulation signals Mrf1 and Mrf2. The stop of input of the harmonic modulation signal to the A/O element causes the oscillation of the oscillator of the A/O element to stop; therefore, the A/O element loses the diffraction-grating function. As a result, the laser beam advances straight, the Q switches 13a and 13b become gate-ON, laser oscillation is implemented, and a pulse laser beam is outputted from the oscillation stage. After, by means of the internal timer of the Q-switch control unit 10, a predetermined gate-ON time $\tau g$ has elapsed, the Q-switch control unit 10 outputs again the Q-switch control signals C1 and C2, and the harmonic-modulation-signal generators 11a and 11b output again the harmonic modulation signals Mrf1 and Mrf2, respectively, thereby making the Q switches 13a and 13b gate-OFF.

Next, the operation of the Q switch of the amplification stage will be explained.

The basic operation is the same as the operation of the Q switch of the oscillation stage; after the Q-switch control unit 10 concurrently outputs Q-switch control signals C3, C4, and C5, the harmonic-modulation-signal generators 11c, 11d, and 11e stop the output of harmonic modulation signals Mrf3, Mrf4, and Mrf5, respectively, whereby the Q switches 13c, 13d, and 13e are made gate-ON. After, by means of the internal timer of the Q-switch control unit 10, a predetermined gate-ON time τg has elapsed, the Q-switch control unit 10 outputs again the Q-switch control signals C1 and C2, and the harmonic-modulation-signal generators 11 output again the harmonic modulation signals, thereby making the Q switches gate-OFF. The respective gate-ON time periods τg's of the oscillation-stage Q switch and the amplification-stage Q switch may be the same value, or may be set separately; they may be set appropriately, in accordance with the machining condition.

Here, the relationship between the gate-ON timing of the oscillation-stage Q switch and the gate-ON timing of the amplification-stage Q switch will be discussed. In a conventional laser system, the gate-ON timing of the amplification-stage Q switch is lagged with respect to the gate-ON timing of the oscillation-stage Q switch; however, in the present invention, the gate-ON timing of the amplification-stage Q switch is made to lead the gate-ON timing of the oscillation-stage Q switch by several dozen nanoseconds.

Figure 2:
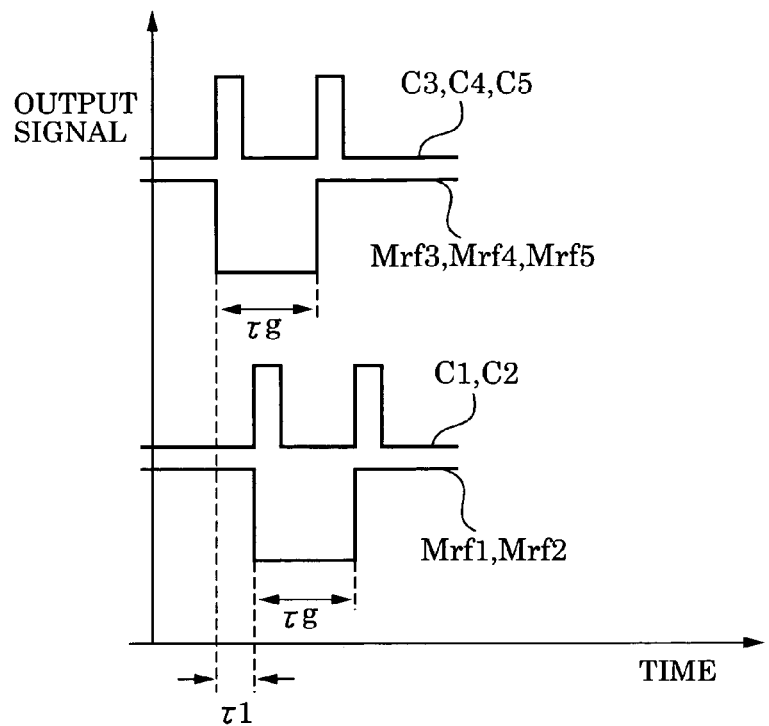
FIG. 2 is a set of graphs representing changes with time in signals for controlling the operation of the Q switches in a laser system according to Embodiment 1 of the present invention.

FIG. 2 is a graph representing changes with time in the Q-switch control signals C1 to C5 and the harmonic modulation signals Mrf1 to Mrf5. In FIG. 2, after the Q-switch control unit 10 outputs the Q-switch control signals C3, C4, and C5, the harmonic-modulation-signal generators 11c, 11d, and 11e output the harmonic modulation signals Mrf3, Mrf4, and Mrf5. In FIG. 2, when a predetermined time τl has elapsed after the output of the Q-switch control signals C3, C4, and C5, the Q-switch control unit 10 outputs the Q-switch control signals C1, and C2, whereupon the harmonic-modulation-signal generators 11a and 11b output the harmonic modulation signals Mrf1 and Mrf2, respectively. Accordingly, the gate-ON timing of the oscillation-stage Q switch and the gate-ON timing of the amplification-stage Q switch differ by τl from each other. As represented in FIG. 2, after, by means of the internal timer of the Q-switch control unit 10, the gate-ON time τg has elapsed, the Q-switch control unit 10 outputs the Q-switch control signals C1 to C5, whereby the output of the harmonic modulation signals Mrf1 to Mrf5 is stopped, thereby making the Q switches gate-OFF.

Figure 3:
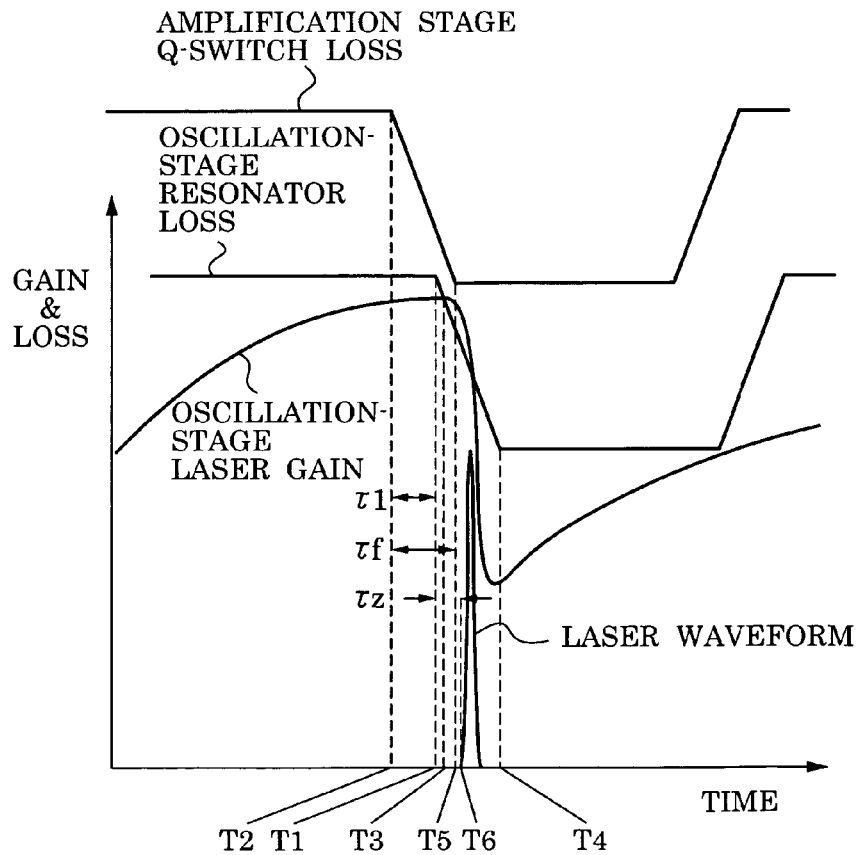
FIG. 3 is a set of graphs, with regard to a laser system according to Embodiment 1 of the present invention, representing changes with time in the resonator loss and the laser gain in the oscillation stage that is provided with a high-gain laser oscillator, the waveform of a pulse laser beam outputted from the oscillation stage, and the loss at the amplification-stage Q switch.
Figure 13:
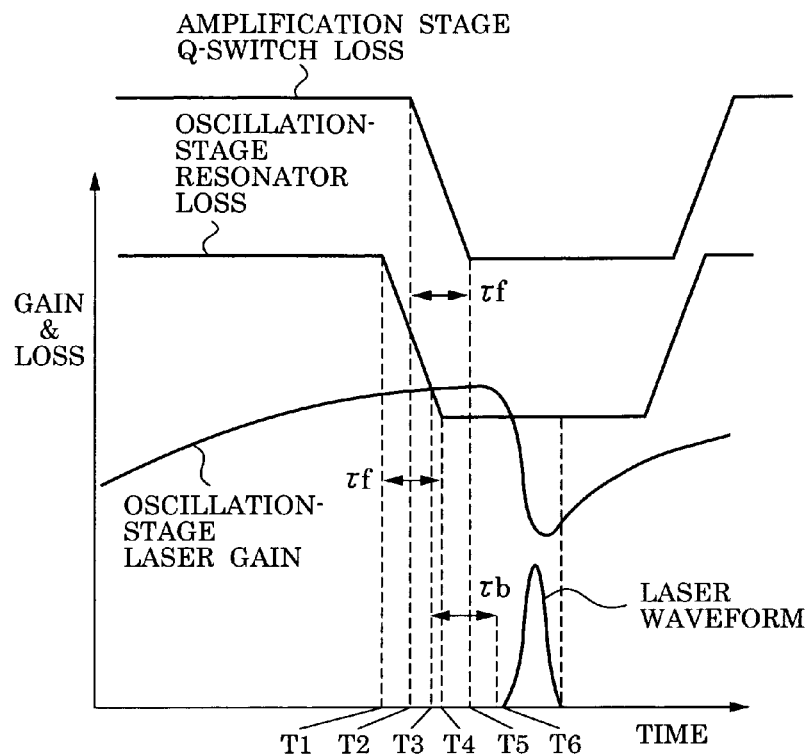
FIG. 13 is a set of graphs, with regard to a conventional laser system provided with a low-gain laser oscillator, representing changes with time in the resonator loss and the laser gain in the oscillation stage, the waveform of a pulse laser beam outputted from the oscillation stage, and the loss at the amplification-stage Q switch.
Figure 14:
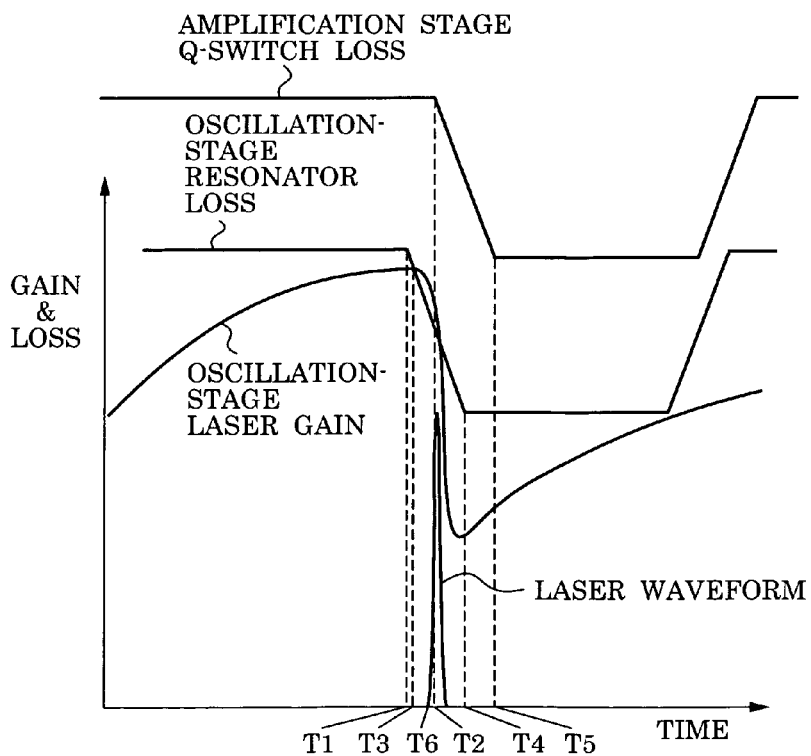
FIG. 14 is a set of graphs, with regard to a conventional laser system provided with a high-gain laser oscillator, representing changes with time in the resonator loss and the laser gain in the oscillation stage, the waveform of a pulse laser beam outputted from the oscillation stage, and the loss at the amplification-stage Q switch.
Figure 15:
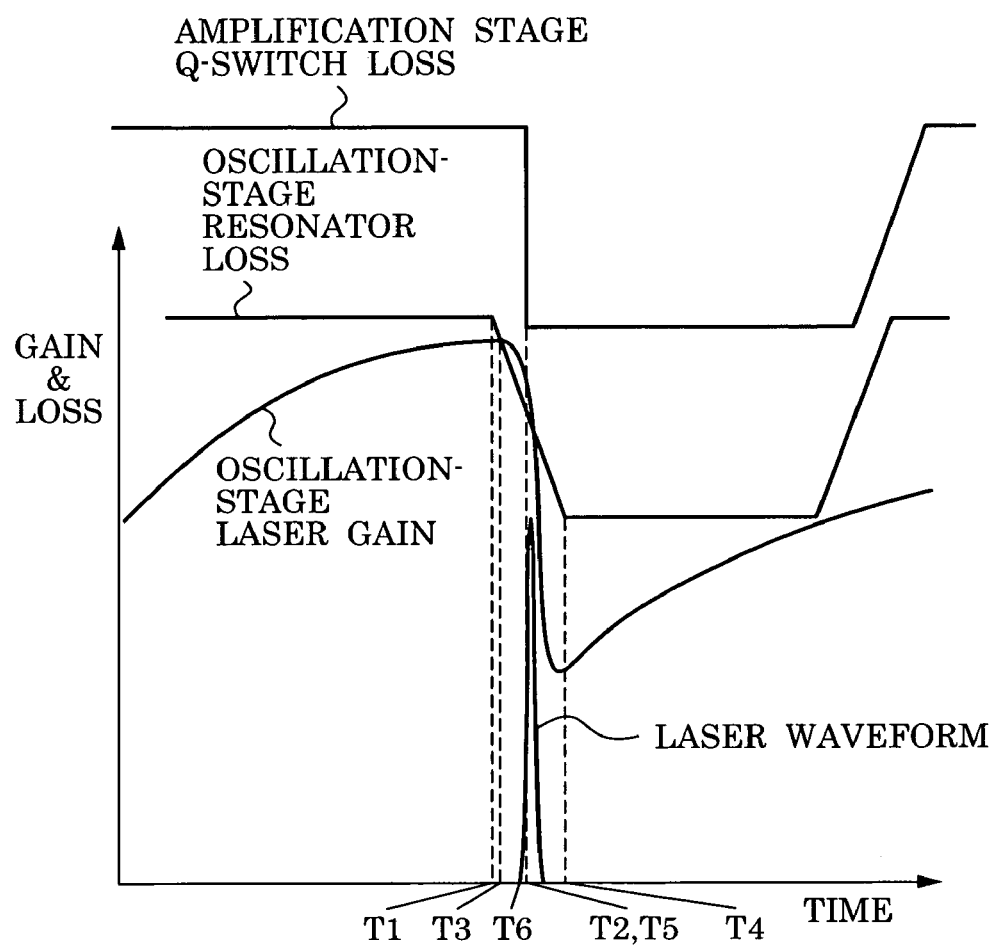
FIG. 15 is a set of graphs representing changes with time in the resonator loss and the laser gain in the oscillation stage, the waveform of a pulse laser beam outputted from the oscillation stage, and the loss at the amplification-stage Q switch, assuming that, in a conventional laser system provided with a high-gain laser oscillator, the fall time of the amplification-stage Q switch is zero.

In the case where the Q switch is operated at the timing represented in FIG. 2, changes with time in the resonator loss and the laser gain in the oscillation stage, the waveform of a pulse laser beam outputted from the oscillation stage, and the loss at the amplification-stage Q switch are as represented in FIG. 3. T1 to T6 in FIG. 3 indicate the same time points as those in FIG. 13.

As represented in FIG. 3, when the gain of the laser oscillator is high, the laser gain rises so steeply that the resonator loss reaches the laser gain, in a short time after the Q switch opens. In other words, the duration from T1 to T3 is short. In addition, a pulse laser beam starts to grow from T3; when the gain is high, the speed of the growth is rapid, whereby the build-up time τb is short. Accordingly, before the time point T4, the growth of the pulse laser beam ends, i.e., the output of the pulse laser beam from the oscillation stage ends.

However, because the gate-ON timing T2 of the amplification-stage Q switch is made to lead the gate-ON timing T1 of the oscillation-stage Q switch by a predetermined time τl, the fall of the diffraction loss at the amplification-stage Q switch can end immediately prior to the time point T6 when the oscillation stage starts to output a laser beam, whereby the loss at the amplification-stage Q switch can be prevented.

Here, the method of setting a predetermined time τl will be explained.

Ideally, the predetermined time τl may be set in such a way that the time point T5 when the fall of the loss at the amplification-stage Q switch ends and the time point T6 when the oscillation stage starts to output a laser beam coincide with each other. However, in practice, the predetermined time τl may be set, in consideration of variations in the fall time τf and the build-up time τb, in such a way that the prevention of the Q-switch loss is emphasized and T5 leads T6, e.g., the timing chart in FIG. 3 is realized.

Specifically, by, to the predetermined time τl, applying the time obtained by subtracting the duration from the time point when the oscillation-stage Q switch is made gate-ON to the time point when the build-up time τb ends, i.e., the duration from T1 to T6, from the fall time of the amplification-stage Q switch, i.e., the duration from T2 to T5, T5 and T6 coincide with each other. In practice, by, to the predetermined time τl, applying the duration that is slightly longer than the duration obtained by subtracting the duration from T1 to T6 from the duration from T2 to T5, the timing chart represented in FIG. 3 is realized.

Accordingly, in an actual laser system, the predetermined time τl may be computed in accordance with the equation τl=τf−τz+α, after separately measuring the duration τz from the time point when the oscillator Q switch is made gate-ON to the time point when the build-up time τb ends and the oscillator starts to output a pulse laser beam, and the fall time τf of the amplification-stage Q switch. The time α may be appropriately set in consideration of variations in τb and τf, it goes without saying that α may be zero.

As described above, a high-gain and high-energy Q-switched laser oscillator is provided in a laser system in a MOPA configuration; therefore, even when the duration τz from the time point when the oscillation-stage Q switch starts the gate ON to the time point when the oscillator starts to output a pulse laser beam is shorter than the fall time τf of the amplification-stage Q switch, by implementing control in such a way that the gate-ON timing of the oscillation-stage Q switch lag behind the gate-ON timing of the amplification-stage Q switch by a predetermined time, the loss in a pulse laser beam in the amplification-stage Q switch can be prevented, while the gain deterioration due to a spontaneously amplified ray produced in the amplification stage is being suppressed. Therefore, a high-energy pulse laser beam can efficiently be obtained.

In Embodiment 1, a configuration is employed in which the first Q switches are arranged at the both sides of a laser medium; however, a configuration may be employed in which the first Q switch is arranged at only one side of a laser medium, when the Q switch enables the loss for a pulse oscillation to be sufficiently ensured.

Moreover, a configuration is employed in which the second Q switches are arranged between the oscillation stage and the amplification stage and between the respective amplifiers; however, in the case where only a few amplifiers, e.g., as illustrated in FIG. 1, only three amplifiers are provided, or the gain of each amplifier is not high, the effect of a spontaneously amplified ray can be suppressed, by arranging the second Q switch between the oscillation stage and the amplification stage, or by arranging the second Q switches at least one position among positions between the amplifiers.

Figure 4:
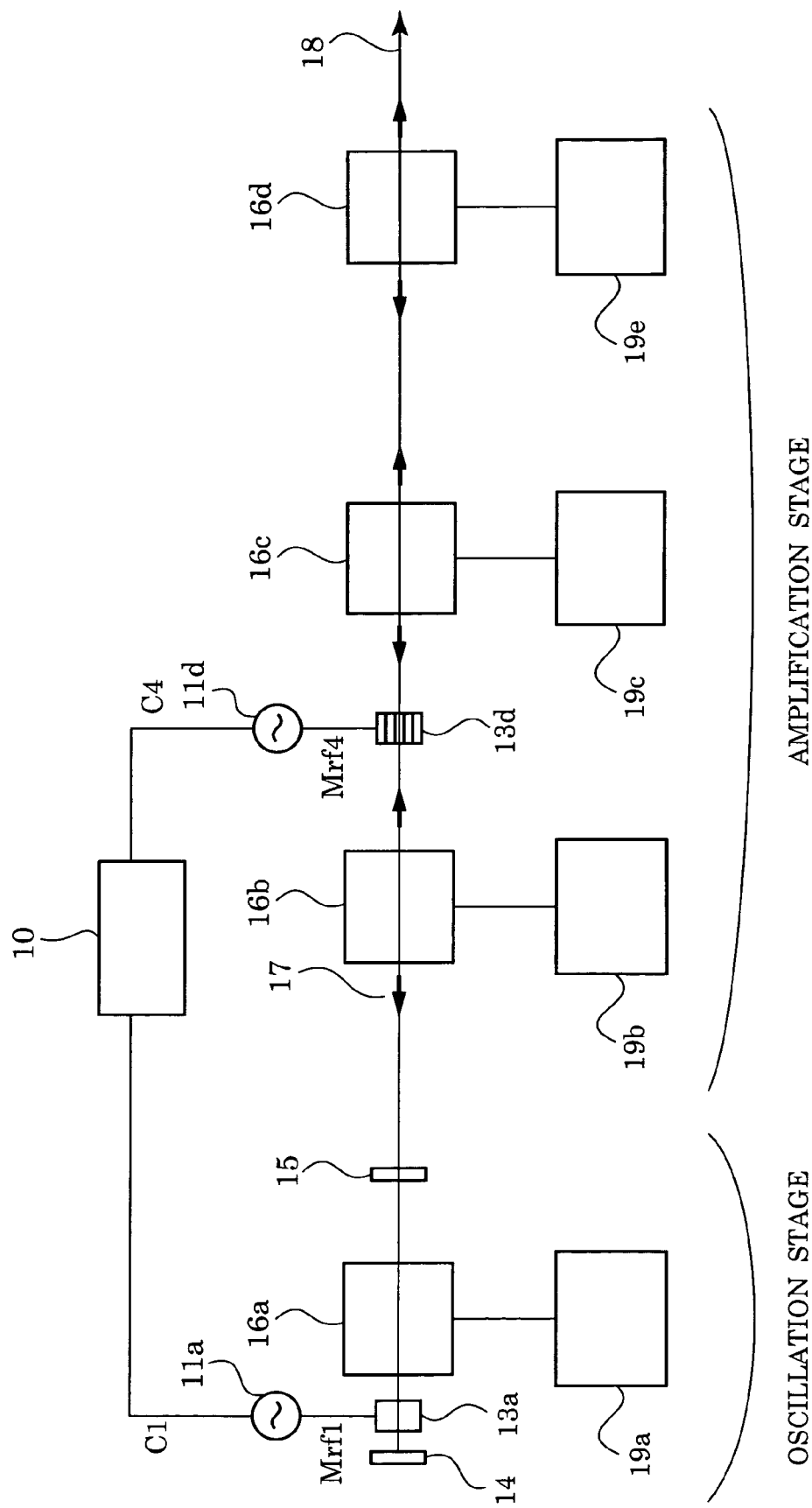
FIG. 4 is a block diagram illustrating another laser system according to Embodiment 1 of the present invention.

For example, any one of the first Q switches 13a and 13b in FIG. 1 may be arranged, and at least one of the second Q switches 13c, 13d, and 13e may be arranged. In this case, for example, when first Q switch 13a and the second Q switch 13d are employed, the configuration of the laser system is as illustrated in FIG. 4. In FIG. 4, the control of the first Q switch 13a and the second Q switch 13d is the same as that described above.

Still moreover, in Embodiment 1, the amplification stage consists of three amplifiers; however, the number of amplifiers is not limited in particular, and application of Embodiment 1 can be implemented when at least one amplifier is provided. When four or more amplifiers are provided, the second Q switches may appropriately be increased in number and arranged between the amplifiers. It goes without saying that the second Q switch is not required to be inserted at each position between the amplifiers; based on the loss at the second Q switch and the gain of the amplifier, a necessary number of the second Q switches may appropriately be inserted.

Figure 5:
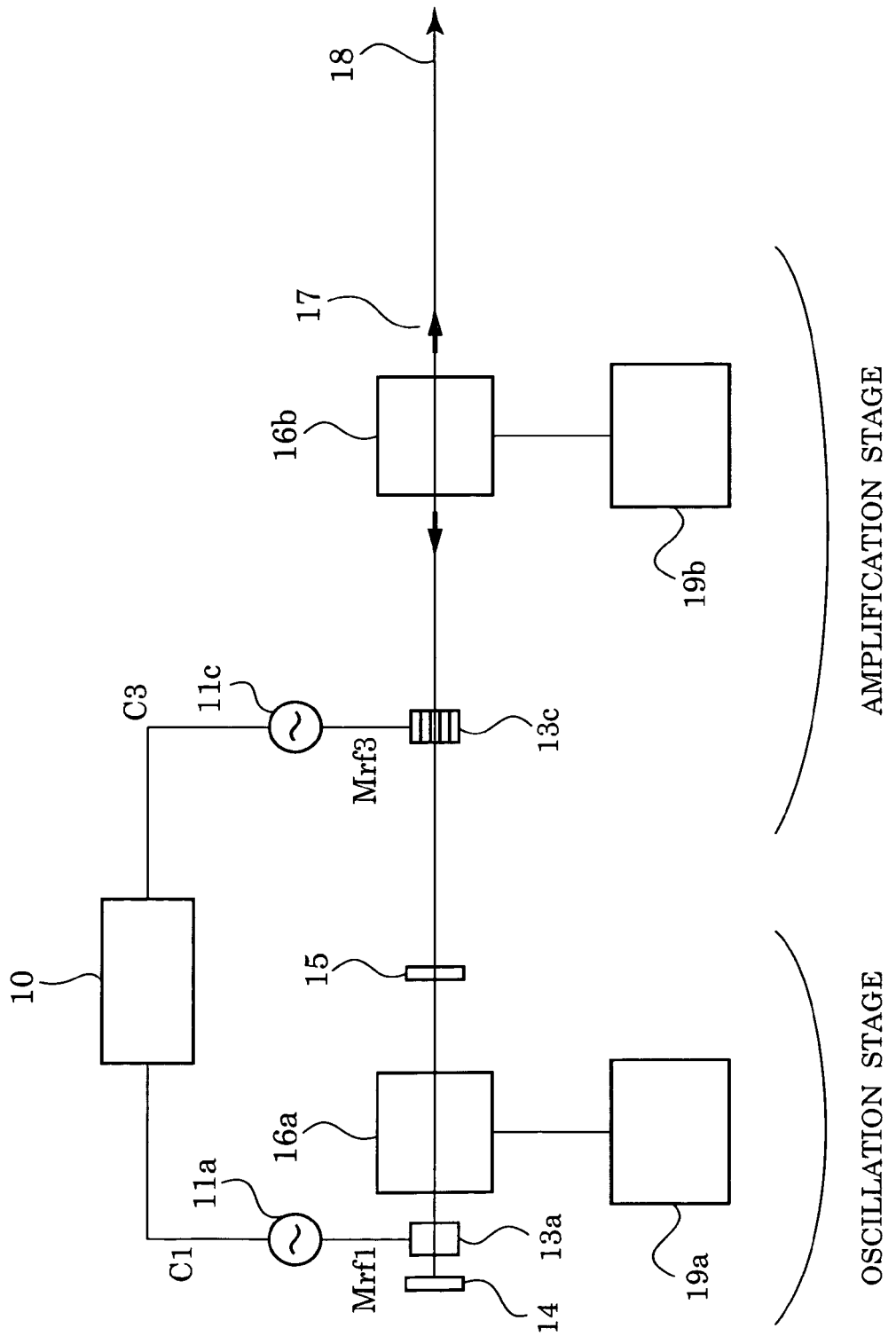
FIG. 5 is a block diagram illustrating another laser system according to Embodiment 1 of the present invention.

When a single amplifier is provided, the configuration of the laser system is as illustrated in FIG. 5. In this case, the second Q switch 13c not only prevents a spontaneously amplified ray produced in the amplifier from reducing the gain of the laser oscillator, but also prevents a spontaneously amplified ray produced in the laser oscillator from reducing the gain of the amplifier. The control of the first Q switch 13a and the second Q switch 13c is the same as that described above.

Figure 6:
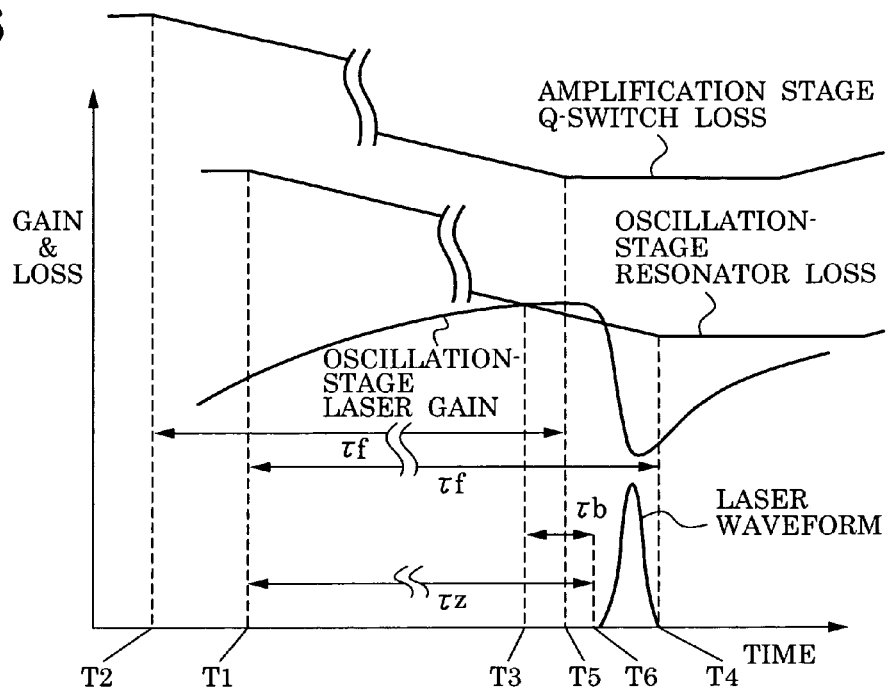
FIG. 6 is a set of graphs, with regard to a laser system, provided with a low-gain laser oscillator, according to Embodiment 1 of the present invention, representing changes with time in the resonator loss and the laser gain in the oscillation stage, the waveform of a pulse laser beam outputted from the oscillation stage, and the loss at the amplification-stage Q switch.

Furthermore, in Embodiment 1, a case has been explained in which, due to provision of a high-gain and high-energy oscillator, $\tau z$ is rendered shorter than $\tau f$; however, even in the case where, because, e.g., the gain of the oscillator is low, $\tau z$ is relatively long, the present invention can be applied to the case where, due to utilization of a mechanical Q switch, $\tau f$ is structurally rendered longer than $\tau z$. In the case where the present invention is applied to a laser system, changes with time in the resonator loss and the laser gain in the oscillation stage, the waveform of a pulse laser beam outputted from the oscillation stage, and the loss at the amplification-stage Q switch are as represented in FIG. 6. As represented in FIG. 6, the growth of the pulse-laser-beam waveform ends before the gate ON of the oscillation-stage Q switch ends; however, because the gate-ON timing of the amplification-stage Q switch is made to lead the gate-ON timing of the oscillation-stage Q switch by a predetermined time, the laser beam enters the amplification stage after the gate ON of the amplification-stage ends. Accordingly, the loss, at the amplification-stage Q switch, in the pulse laser beam can be prevented.

In other words, the present invention can very effectively be applied to the case where, depending on condition setting for and the structure of a laser system, the duration $\tau z$ from the time point when the oscillation-stage Q switch starts the gate ON to the time point when the oscillator starts to output a pulse laser beam is rendered shorter than the fall time $\tau f$ of the amplification-stage Q switch.

Embodiment 2

In Embodiment 1, a configuration has been explained in which control is implemented in such a way that the gate-ON timing of the amplification-stage Q switch is earlier than the gate-ON timing of the oscillation-stage Q switch; here, the gate-OFF timing will be described. The configuration of a laser system is the same as that in FIG. 1; therefore, the gate-OFF timing will be explained by appropriately utilizing Reference Characters marked in FIG. 1.

When the amplification-stage Q switches 13c, 13d, and 13e are not made gate-ON, a spontaneously amplified ray 17 that is made to enter adjacent amplifiers or the laser medium 16 of the oscillator is suppressed; therefore, the laser gain increases to a sufficient level until the amplification-stage Q switches 13c, 13d, and 13e are made gate-ON. After the amplification-stage Q switches 13c, 13d, and 13e are made gate-ON, the spontaneously amplified ray 17 enters adjacent amplifiers or the laser medium 16 of the oscillator, whereby the gain starts to decrease. However, compared with the energy of a laser beam, the energy of the spontaneously amplified ray 17 is small, e.g., approximately 50 W at the output of the amplification stage, i.e., the pace of gain reduction is sufficiently slow. Accordingly, by making the Q switches gate-OFF before the reduction of the gain becomes conspicuous, it is possible to make the change with time, due to the spontaneously amplified ray, in the gain almost unsusceptible to the ON-OFF operation of the Q switches.

Figure 7:
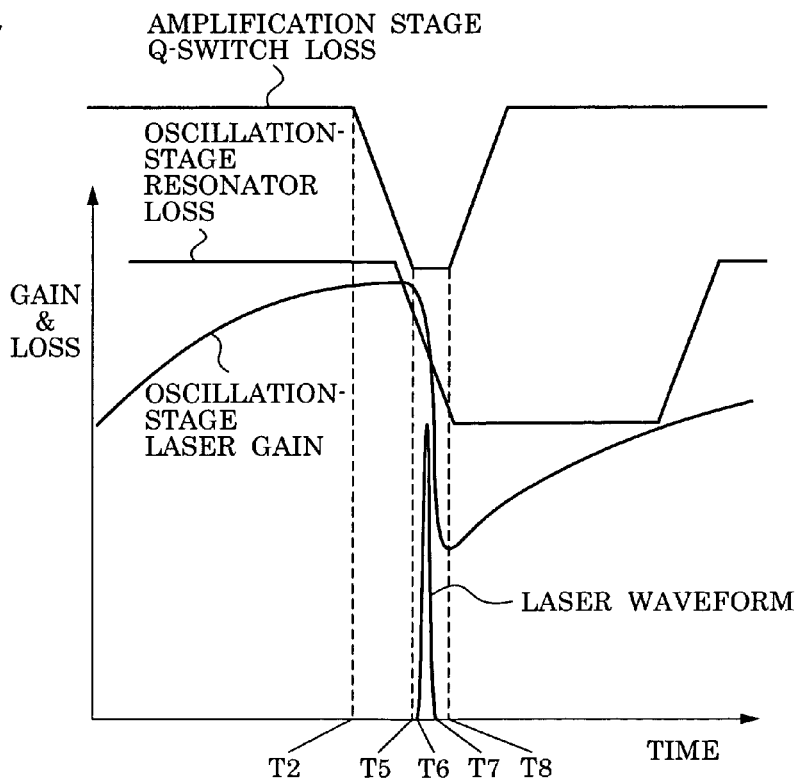
FIG. 7 is a set of graphs, with regard to a laser system according to Embodiment 2 of the present invention, representing changes with time in the resonator loss and the laser gain in the oscillation stage, the waveform of a pulse laser beam outputted from the oscillation stage, and the loss at the amplification-stage Q switch.

Accordingly, it is desirable to set the gate-OFF timing of the amplification-stage Q switch at the time point immediately after the generation of a pulse laser beam is completed. In the case where the Q switches are operated with that timing, changes with time in the Q-switch loss and the laser gain in the oscillation stage, the waveform of a pulse laser beam outputted from the oscillation stage, and the Q-switch loss in the amplification-stage are represented in FIG. 7. T5 and T6 in FIG. 7 indicate the same time points as those in FIG. 13; T7 indicates the time point when the growth of a pulse laser beam ends; T8 indicates the time point when the amplification-stage Q switch closes and the Q-switch loss starts to rise.

As represented in FIG. 7, the amplification-stage Q switches 13c, 13d, and 13e end their gate-ON modes at the time point T5 that is immediately before the time point T6 when the growth of the pulse laser beam 18 becomes conspicuous. Next, the amplification-stage Q switches 13c, 13d, and 13e start the gate OFF from the time point T8 that is immediately after the time point T7 when the growth of the pulse laser beam 18 ends. As described also in Embodiment 1, ideally, it is desirable that T5 and T6 coincide with each other; however, in practice, T5 is set in such a way as to lead T6, in consideration of variations in the fall time $\tau l$, the pulse width of a pulse laser beam, and the like. Similarly, in consideration of the variations, the gate-ON timing of the amplification-stage Q switch may appropriately be set in such a way that T8 slightly lags behind T7, e.g., the timing chart in FIG. 7 is realized.

Specifically, assuming that the width from T6 to T7 of the pulse laser beam is $\tau w$, the duration from T2 to T8, i.e., the duration from the time point when the amplification-stage Q switch starts the gate ON to the time point when the amplification-stage Q switch starts the gate OFF is given by $\tau f + \alpha + \tau w + \beta$. The time period $\alpha$ here is the same as that set in Embodiment 1; the time period $\beta$ may be appropriately set, in consideration of the extent of variations in $\tau w$ and $\tau f$, and it goes without saying that $\tau w$ and $\tau f$ may be zero.

As described above, by setting the gate-OFF timing of the amplification-stage Q switch immediately after the time point when the growth of a pulse laser beam ends, it is possible to suppress the gain reduction, due to a spontaneously amplified ray, in the amplification stage or the oscillation stage more than the laser system described in Embodiment 1 does.

Embodiment 3

In Embodiment 1, the laser system is configured in such a way that, by shifting the control signal outputted from the Q-switch control unit by $\tau l$, the gate-ON timing of the amplification-stage Q switch is made to lead the gate-ON timing of the oscillation-stage Q switch by $\tau l$. In a laser system according to Embodiment 3, the gate-ON timing of the amplification-stage Q switch is mechanically adjusted in such a way as to lead $\tau$ the gate-ON timing of the oscillation-stage Q switch by $\tau l$.

Figure 8:
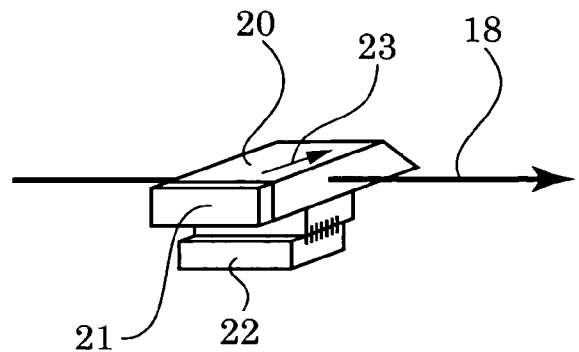
FIG. 8 is a view illustrating a Q switch of a laser system according to Embodiment 3 of the present invention.

The overall outline of the laser system according to Embodiment 3 is approximately the same as that in FIG. 1; therefore, the laser system will be explained by appropriately utilizing Reference Characters marked in FIG. 1. FIG. 8 is a view of the configuration of a Q switch, formed of an A/O element, utilized in Embodiment 3; that Q switch corresponds to each of the Q switches 13a to 13e in FIG. 1. In FIG. 8, a harmonic modulation signal outputted from the harmonic-modulation-signal generator 11 is made to enter an oscillator 21, whereupon the oscillator 21 oscillates at high frequency. The oscillation of the oscillator 21 generates ultrasound 23 in a quartz glass 20 connected to the oscillator 21; as indicated by the arrow in FIG. 8, the ultrasound 23 is transmitted in a direction approximately perpendicular to the laser beam 18. The oscillator 21 and the quartz glass 20 are held by a position adjustment means 22, such as an optical stage, having a function of moving in parallel in the same direction as that in which the ultrasound 23 is transmitted. Accordingly, the positions of the oscillator 21 and the quartz glass 20 can freely be changed in the direction in which the ultrasound 23 is transmitted, i.e., in the direction perpendicular to the laser beam 18.

Next, the operation of the laser system will be explained. In Embodiment 3, the Q-switch control signals C1 to C5 are outputted at the same timing from the Q-switch control unit 10. Instead, a single signal C1 may be inputted to the respective harmonic-modulation-signal generators 11a to 11e. Accordingly, the harmonic-modulation-signal generators 11a to 11e generate at the same timing respective harmonic modulation signals.

However, unless further measures are taken, the gate-ON timing of the amplification-stage Q switch and the gate-ON timing of the oscillation-stage Q switch coincide with each other; therefore, by, through the Q-switch-position adjustment means 22, shifting the position of the amplification-stage Q switch from the position of the oscillation-stage Q switch, the gate-ON timings are shifted from each other. The method of shifting the Q-switch positions so as to shift the gate-ON timings will be explained with reference to FIG. 9.

Figure 9A:
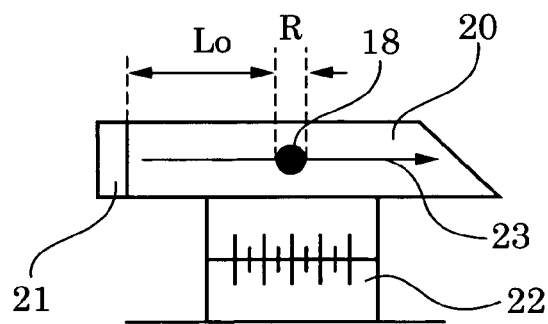
FIG. 9 is a set of views illustrating a Q switch of a laser system according to Embodiment 3 of the present invention.
Figure 9B:
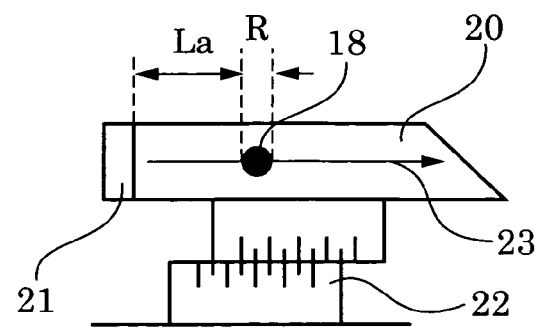

FIG. 9 is a set of views each illustrating a Q switch, viewed along the optical axis of the laser beam 18. FIG. 9(a) is a view illustrating each of the oscillation-stage Q switches 13a and 13b; FIG. 9(b) is a view illustrating each of the amplification-stage Q switches 13c, 13d, and 13e. The ultrasound 23 caused by the oscillator 21 propagates in a direction indicated by the arrow in FIG. 9. In this situation, because the ultrasound 23 has a finite speed, it takes a time for the ultrasound propagates from the oscillator 21 to the laser beam 18. In FIG. 9(a), letting Lo and V denote the distance between the oscillator 21 and the laser beam 18 and the sonic speed in the quartz glass 20, respectively, the time $\tau o$ required for the ultrasound 23 propagates from the oscillator 21 to the laser beam 18 is given by the equation $\tau o = Lo/V$. Similarly, in FIG. 9(b), letting La denote the distance between the oscillator 21 and the laser beam 18, the time $\tau a$ required for the ultrasound 23 propagates from the oscillator 21 to the laser beam 18 is given by the equation $\tau a = La/V$.

In this situation, when the Q-switch control unit 10 outputs the Q-switch control signals, the respective oscillators 21 of the Q switches concurrently start to oscillate, whereupon the propagation of the ultrasound 23 starts from the oscillator 21. Accordingly, if, as illustrated in FIG. 9, Lo of the oscillation-stage Q switch and La of the amplification-stage Q switch differ from each other, the times required for the ultrasound 23 to reach the laser beam 18 differ from each other, whereby the gate-ON timings shift from each other. In the present invention, it is only necessary that the gate-ON timing of the amplification-stage Q switch is made to lead the gate-ON timing of the oscillation-stage Q switch by $\tau l$; therefore, as illustrated in FIG. 9, it is only necessary that, through the position adjustment means 22, La is made to be shorter than Lo. Specifically, $\tau o - \tau a = Lo/V - La/V = \tau l$ and from Embodiment 1, $\tau l = \tau f - \tau z + \alpha$; therefore, it is only necessary that Lo and La are set so as to satisfy the equation $Lo - La = (\tau f - \tau z + \alpha) \cdot V = (\tau f - \tau z) \cdot V + \gamma$ (where $\gamma = \alpha \cdot V$).

Figure 10:
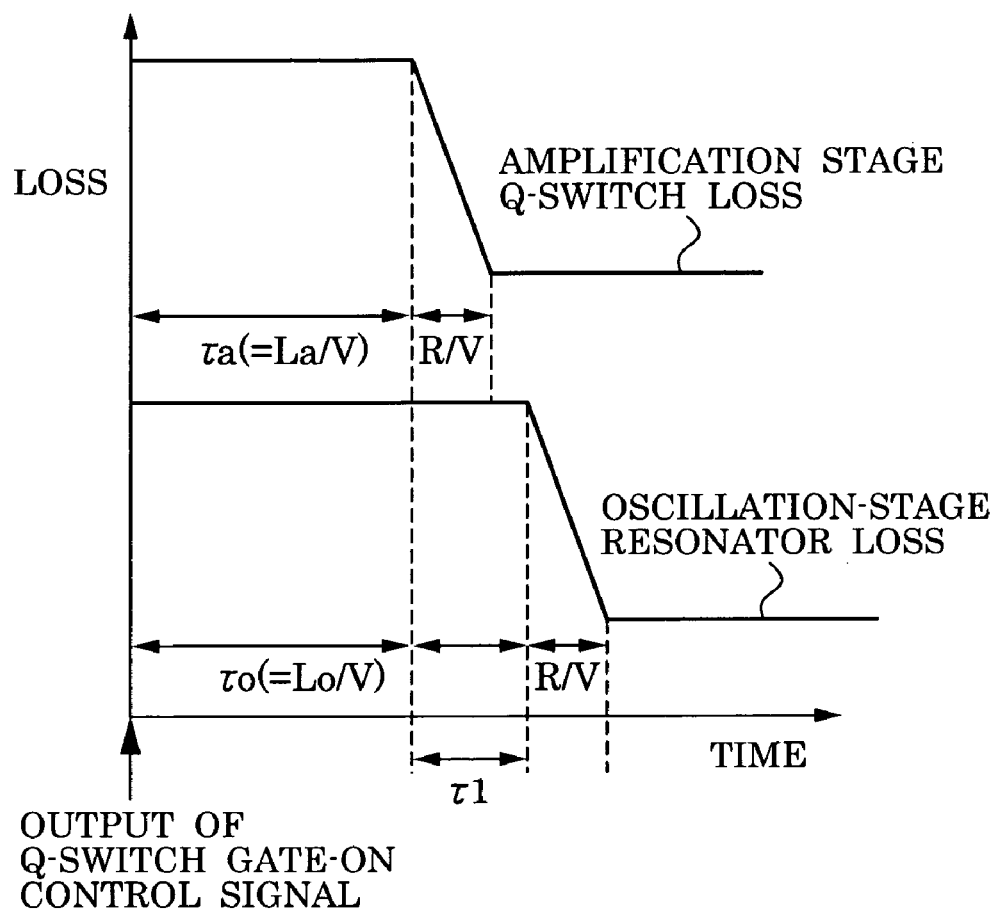
FIG. 10 is a set of graphs, with regard to a laser system according to Embodiment 3 of the present invention, representing changes with time in the resonator loss in the oscillation stage and the loss at the amplification-stage Q switch.

In the case where Lo and La are set as described above, changes with time in the loss in the amplification-stage Q switch and the loss in the oscillation-stage are as represented in FIG. 10. Here, let R denote the beam diameter of the laser beam 18 in the Q switch. The Q switch is made gate-ON $\tau a$ ($=La/V$) after the Q-switch control signal is outputted, whereupon the loss in the amplification-stage Q switch starts to fall. The fall time $\tau f$, which is the time in which the ultrasound 23 passes across the beam diameter of the laser beam 18, is given by $R/V$. Accordingly, in $\tau a + \tau f$ ($=R/V$), the gate OFF of the Q switch ends, whereupon the fall of the loss in the Q switch ends.

In contrast, the Q switch is made gate-ON $\tau o$ ($=Lo/V$) after the Q-switch control signal is outputted, whereupon the loss in the oscillation-stage oscillator starts to fall. As is the case with the amplification stage, the fall time $\tau f$ is given by $R/V$. Accordingly, in $\tau o + \tau f$ ($=R/V$), the gate OFF of the Q switch ends, whereupon the fall of the loss in the oscillator ends.

In this situation, when La and Lo are set appropriately, the equation $\tau o - \tau a = \tau l$ is satisfied, whereby the same effect as that of Embodiment 1 can be demonstrated. Moreover, $\tau l$ may be set to approximately several dozen nanoseconds; for example, in the case where $\tau l$ is set to 50 ns, the difference between Lo and La may be set to 0.3 mm, because the sonic speed V in quartz glass is approximately 6 km/s. The value is within a range in which adjustment can accurately be implemented; therefore, no extremely expensive adjustment means is required.

Still moreover, in the foregoing explanation, a configuration is employed in which the amplification-stage Q switch and the oscillation-stage Q switch are each provided with an adjustment means; however, because what is important is the difference between Lo and La and by providing an adjustment means in either one of the oscillation-stage Q switch and the amplification-stage Q switch, a desired positional difference can be realized, the number of the V can be reduced. Furthermore, in the case where, because the machining condition is always constant, it is only necessary that the difference between Lo and La is always fixed, no adjustment means may be provided and the respective Q switches may be fixed to the laser system in such a way that the difference between Lo and La is a desired value.

As a result, in Embodiment 3, it is enabled at low cost that the gate-ON timing of the amplification-stage Q switch is made lead the gate-ON timing of the oscillation-stage Q switch by a predetermined time.

Embodiment 4

Figure 11:
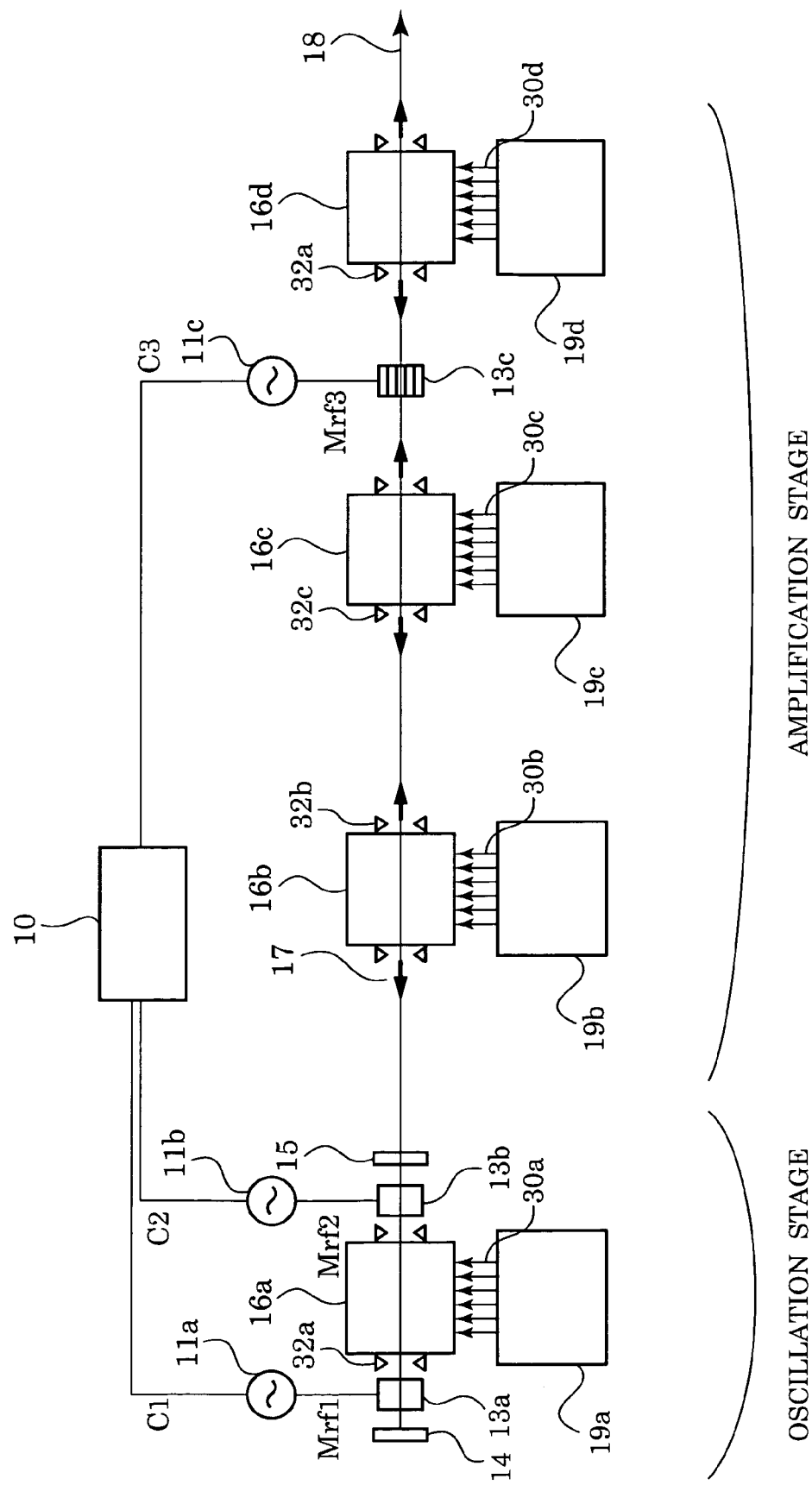
FIG. 11 is a block diagram illustrating a laser system according to Embodiment 4 of the present invention.

FIG. 11 is a block diagram illustrating a laser system according to Embodiment 4 for implementing the present invention. In the foregoing embodiments, an arbitrary laser medium is utilized; however, in Embodiment 4, as a laser medium, a rod-type solid-state laser medium (referred to also as a rod, hereinafter) is utilized in particular. The basic configuration of the laser system illustrated in FIG. 11 is the same as that of the laser system, in FIG. 1, according to Embodiment 1; therefore, with regard to the constituent elements in the same configuration, the same reference characters are utilized and detailed explanations for them will be omitted.

In FIG. 11, Reference Character 16a denotes a rod-type solid-state laser medium of an oscillation stage; Reference Characters 16b, 16c, and 16d denote respective rod-type solid-state laser media of an amplification stage; Reference Characters 19a to 19d denote respective pumping beam sources for pumping the rod-type solid-state laser media 16a to 16d; the respective laser media are pumped by pumping beams 30a to 30d. The solid-state laser medium is exemplified by Nd:YAG, and the pumping beam source is exemplified by a lamp or a laser diode. Reference Numerals 32 are limiting apertures for cutting off an unnecessary portion of a laser beam to prevent a defect such as the burnout of a rod end. What differs most from the configuration according to Embodiment 1 is that only one amplification-stage Q switch is provided. The laser system is configured in such a way that only one amplification-stage Q switch 13e is provided between the last amplifier in a first amplification stage and the first amplifier in a second amplification stage, and Q switches 13c and 13d in FIG. 1 are removed.

The transition of a rod-type solid-state laser medium includes nonradiative transition; therefore, the generation of heat cannot be prevented in principal. Thus, in general, the heat is eliminated by making cold water flow alongside the rod to cool the sides of the rod. In this case, because the thermal energy produced in the rod flows toward the cooling system provided alongside the rod, heat flux is generated that radially flows from the center pf the rod toward the cooling system. Accordingly, a temperature distribution is caused within the rod, whereby a refraction-index gradient is produced. In general, in order to make the refraction-index gradient symmetric, the pumping beam sources 19a to 19d are each arranged symmetrically with respect to the respective center axes of the rods. Accordingly, within the rod, a temperature distribution is produced that is coaxial with respect to the center axis of the rod; similarly, the distribution of the refraction-index gradient becomes coaxial, whereby the rod functions, as a positive-curvature thick-wall lens, for a laser beam. FIG. 11 illustrates a configuration in which the pumping beams are irradiated onto the rod only from one direction; however, in practice, the pumping beams are irradiated onto the rod symmetrically with respect to the center axis of the rod.

Accordingly, the beam profile of the beam 18 becomes as illustrated in FIG. 12(a); the beam diameter increases in the rod and is decreased outside the rod. The laser beam 18 is emitted from the oscillation stage and has a high convergence; as illustrated in FIG. 12(a), the respective beam diameters in the amplifiers are approximately equal to one another, and the respective beam diameters at the spaces between the amplifiers are also approximately equal to one another.

In contrast, the beam profile of the spontaneously amplified ray 17 is as illustrated in FIG. 12(b). Because it is not generated through resonance, the spontaneously amplified ray 17 has an extremely low convergence; for example, the M2 of the laser beam 18 is approximately 12 mm·mrad, and the M2 of the spontaneously amplified ray 17 is 200 mm·mrad or larger (the same as or larger than the measurement limit). Here, M2, which is an indicator that represents the convergence, is disclosed in detail in SPIE, vol. 1414, "Laser Beam Diagnostics", 1991.

Accordingly, in the vicinity of the last amplifier in the amplification stage, the proportion of a portion, of the spontaneously amplified ray 17, that is cut off by the aperture 32b to a portion that enters the amplifier is large. However, in the vicinity of the first amplifier in the amplification stage, due to the lens effects of the amplifier rods, the convergence of the spontaneously amplified ray 17 is enhanced; for example, in the last amplifier in the amplification stage, M2 is improved down to 50 mm·mrad. Accordingly, at the last amplification stage, the portion, of the spontaneously amplified ray 17, that is cut off by the aperture decreases and the portion that enters the amplifier increases.

Therefore, because the gain reduction due to the spontaneously amplified ray 17 is conspicuous at the last amplifier in the amplification stage, the effect of suppressing the spontaneously amplified ray 17 can sufficiently be demonstrated, even in the case where only the spontaneously amplified ray 17 that enters the last amplification stage is suppressed. Accordingly, as illustrated in FIG. 11, the Q switch 13e may be provided only at the position between the last amplifier in the first amplification stage and the first amplifier in the second amplification stage.

In Embodiment 1, it has been explained that, in the case where only a few amplifiers, e.g., only three amplifiers are provided, or the gain of each amplifier is not high, the second Q switch may be arranged at least one position among positions between the amplifiers; however, when a rod-type laser medium is employed, it is effective to arrange a single Q switch in the amplification stage, as Embodiment 4, even in the case where a great number of amplifiers are utilized or the gain of each amplifier is high.

It has been ascertained that, owing to the configuration described above, the output reduction of the laser beam 18 is improved, as is the case with Embodiment 1; additionally, the number of respective Q switches to be arranged between the amplifiers can be reduced, whereby cost reduction of the laser system is enabled.

INDUSTRIAL APPLICABILITY

In particular, when being applied to a laser system that is in a MOPA-configuration and incorporates a high-gain and high-energy laser oscillator, the present invention demonstrates a conspicuous effect.

What is claimed is:

1. A laser system comprising:
   a laser oscillator, having a first Q switch in a resonator thereof, for outputting a pulse laser beam by making the first Q switch gate-ON and gate-OFF;
   one or more amplifiers, for amplifying a pulse laser beam outputted from the laser oscillator, that are arranged along the optical axis of the pulse laser beam;
   a second Q switch arranged at a position between the oscillator and the amplifiers or at at least one position among positions between the amplifiers; and
   an adjustment means for adjusting gate-ON time points of the first and the second Q switch in such a way that the second Q switch becomes gate-ON a predetermined time earlier than the first Q switch becomes gate-ON.

2. A laser system comprising:
   a laser oscillator, having a first Q switch in a resonator thereof, for outputting a pulse laser beam by making the first Q switch gate-ON and gate-OFF;
   one or more amplifiers, for amplifying a pulse laser beam outputted from the laser oscillator, that are arranged along the optical axis of the pulse laser beam;
   a second Q switch arranged at a position between the oscillator and the amplifiers or at at least one position among positions between the amplifiers; and
   an adjustment means for adjusting gate-ON time points of the first and the second Q switch in such a way that, in the case where a fall time of the second Q switch is longer than duration from a time point when the first Q switch becomes gate-ON to a time point when the laser oscillator starts to output a pulse laser beam, the second Q switch becomes gate-ON a predetermined time earlier than the first Q switch becomes gate-ON.

3. The laser system according to claim 1, wherein, assuming that the fall time of the second Q switch is τf and the duration from a time point when the first Q switch becomes gate-ON to a time point when the laser oscillator starts to output a pulse laser beam is τz, the predetermined time is set to τf−τz.

4. The laser system according to claim 1, wherein the first and the second Q switch are formed of an A/O element.

5. The laser system according to claim 1, wherein the adjustment means is a Q-switch control unit that outputs one control signal a predetermined time earlier than the other control signal is outputted, the control signal and the other control signal being outputted for instructing the gate ON of the first Q switch and the gate ON of the second Q switch, respectively.

6. The laser system according to claim 4, wherein the adjustment means arranges the Q switches in such a way that the distance between an oscillator of the A/O element for the first Q switch and the optical axis of a pulse laser beam that passes through the A/O element for the first Q switch is made a predetermined distance longer than the distance between an oscillator of the A/O element for the second Q switch and the optical axis of the pulse laser beam that passes through the A/O element for the second Q switch.

7. The laser system according to claim 6, wherein, assuming that the fall time of the second Q switch is τf, the duration from a time point when the first Q switch becomes gate-ON to a time point when the laser oscillator starts to output a pulse laser beam is τz, and the sonic speed within the A/O element is V, the predetermined distance is set to (τf −τz)·V or longer.

8. The laser system according to claim 6, wherein the adjustment means adjusts the arrangement of the Q switches, through a position adjustment means that moves in parallel the A/O element in a direction that is approximately the same as a transmission direction of a sound wave within the A/O element.

9. The laser system according to claim 1, wherein the second Q switch becomes gate-OFF at a time point immediately after the laser oscillator completes outputting a pulse laser beam.

10. The laser system according to claim 1, wherein the laser oscillator is oscillated by pumping a rod-type solid-state laser medium and has two or more of the amplifiers, and the second Q switch is arranged only at the position between the amplifier situated at the last stage and the amplifier situated immediately before the amplifier situated at the last stage.

11. A control method for a laser system, comprising the steps of:
making gate-ON a first Q switch that, in a laser system including a laser oscillator and one or more amplifiers, is provided in a resonator of the laser oscillator so that a pulse laser beam is outputted; and
making gate-ON a second Q switch a predetermined time earlier than the first Q switch is made gate-ON in the case where a fall time of the second Q switch is longer than duration from a time point when the first Q switch becomes gate-ON to a time point when the laser oscillator starts to output a pulse laser beam, the second Q switch being arranged at a position between the oscillator and the amplifiers or at at least one position among positions between the amplifiers.

12. The control method for a laser system, according to claim 11, further comprising the step of setting the predetermined time to τf−τz or longer, assuming that the fall time of the second Q switch is τf and the duration from a time point when the first Q switch becomes gate-ON to a time point when the laser oscillator starts to output a pulse laser beam is τz.

* * * * *